No. 616,871.  
V. D. ALLEN.  
CAKE BAKING PAN.  
(Application filed Nov. 4, 1893.)  
(No Model.)  
Patented Jan. 3, 1899.

WITNESSES:  
H. B. Bradshaw  
A. L. Phelps

INVENTOR  
Virgil D. Allen  
BY  
Staley and Shepherd  
ATTORNEYS

UNITED STATES PATENT OFFICE.

VIRGIL D. ALLEN, OF COLUMBUS, OHIO.

CAKE-BAKING PAN.

SPECIFICATION forming part of Letters Patent No. 616,871, dated January 3, 1899.

Application filed November 4, 1893. Serial No. 489,982. (No model.)

*To all whom it may concern:*

Be it known that I, VIRGIL D. ALLEN, a citizen of the United States, residing at Columbus, in the county of Franklin and State of Ohio, have invented a certain new and useful Improvement in Cake-Baking Pans, of which the following is a specification.

My invention relates to the improvement of cake-pans of that class wherein a detachable bottom plate is provided. The objects of my invention are to provide an improved cake-pan of this class of superior construction, to provide improved detachable connections between said bottom plate and the pan wall or band, and to produce the same in a neat, simple, and inexpensive form. These objects I accomplish in the manner illustrated in the accompanying drawings, in which—

Figure 1:
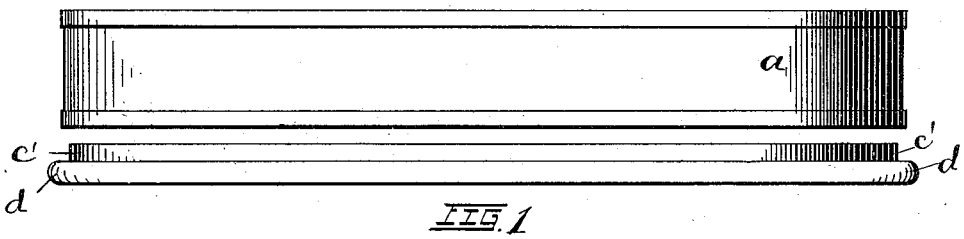
Figure 2:
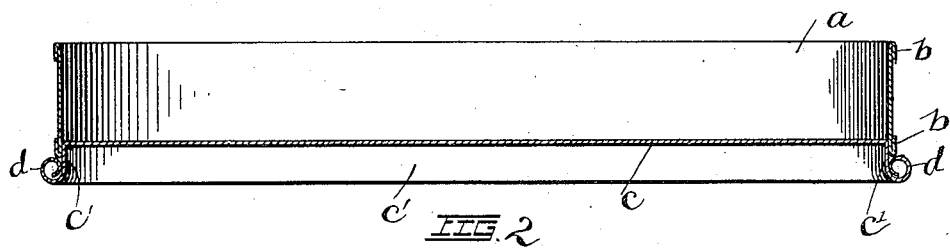
Figure 3:
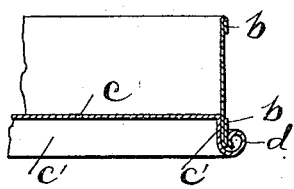
Figure 4:
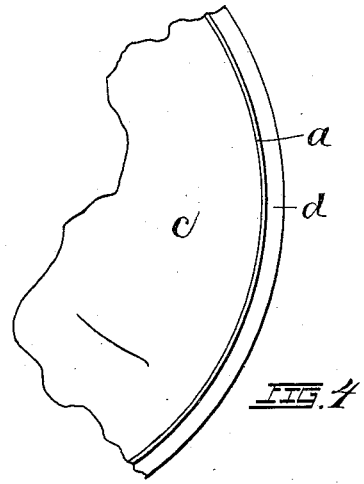

Figure 1 is a side elevation of my improved cake-pan, showing the bottom detached therefrom. Fig. 2 is a central transverse section of said pan, showing the bottom connected therewith. Fig. 3 is a detail sectional view of a portion of said pan, showing a modification in the manner of forming a connection between the pan-wall and bottom plate; and Fig. 4 is a plan view of a portion of said pan.

Similar letters refer to similar parts throughout the several views.

$a$ represents the pan body or wall, which, as shown, is in the form of a circular band and serves in the usual manner to form the pan sides. In forming this pan band or body I reinforce the upper and lower edges thereof by doubling the same against the pan-wall, as indicated at $b$.

$c$ represents the bottom plate, which, as shown in the drawings, consists of a disk having a downturned edge portion or flange, as indicated at $c'$, said flange terminating in an outwardly and thence inwardly coiled roll $d$, said roll forming, as shown in the drawings, a continuous circumferential bead about the base of the bottom flange. In forming a temporary connection between said bottom and the band the lower portion of the latter is made to fit snugly about, as shown, the upper portion of the side or flange $c'$ of said bottom plate, while the lower reinforced edge of the band may rest upon the roll $d$, or, as indicated in Fig. 3 of the drawings, said edge may be forced downward between the inner coil of the roll and the bottom flange, the roll thus being made to serve the purpose of a spring-catch to form a more secure connection between the pan bottom and band.

From the construction herein shown and described it is evident that the bottom may be readily pulled downward and disengaged from the side band and that the cake which has been baked in said pan may then be easily removed from said plate without cutting or mutilating the cake.

It will be observed that the pan-band is of such form as to admit of its reversal, both its upper and lower ends being of corresponding size. It will also be observed that by my construction the cake-supporting portion of the bottom plate is elevated from the stove-oven plate or other heating-support, which, as will readily be seen, will serve to prevent any tendency of the cake-bottom being burned and facilitate the uniform heating of the cake.

From the construction which I have shown and described it is obvious that cake-pans of this class may be readily and cheaply produced in a neat, simple, and practical form.

Having now fully described my invention, what I claim, and desire to secure by Letters Patent, is—

In a cake-baking pan a flat and solid bottom plate $c$ having flanged sides, said sides having a rolled supporting-base, of a band $a$ the lower portion of which is adapted to fit about the upper portion of said base-plate and the lower edge of which is adapted to detachably engage with the rolled edge of said base-plate, substantially as and for the purpose specified.

VIRGIL D. ALLEN.

In presence of—
GEO. B. HISCHE,
C. C. SHEPHERD.